United States Patent [19]

Gött et al.

[11] 4,190,758
[45] Feb. 26, 1980

[54] GRID WELDING MACHINE

[75] Inventors: Hans Gött; Gerhard Ritter, Klaus Ritter; Josef Ritter, all of Graz, Austria

[73] Assignee: EVG Entwicklungs- u. Verwertungs-Gesellschaft mbH., Steiermark, Austria

[21] Appl. No.: 889,747

[22] Filed: Mar. 24, 1978

[30] Foreign Application Priority Data

Apr. 18, 1977 [AT] Austria ................................ 2699/77

[51] Int. Cl.² .............................................. B23K 11/06
[52] U.S. Cl. ........................................ 219/56; 219/58; 219/103
[58] Field of Search ........................... 219/56, 58, 103; 140/112

[56] References Cited

U.S. PATENT DOCUMENTS

| | | | |
|---|---|---|---|
| 1,175,516 | 3/1916 | French | 219/56 |
| 1,994,701 | 3/1935 | Hall | 219/103 |
| 3,410,319 | 11/1968 | Gott | 140/112 |
| 3,431,952 | 3/1969 | Gott | 140/112 |

FOREIGN PATENT DOCUMENTS

| | | | |
|---|---|---|---|
| 17278 | 12/1928 | United Kingdom | 219/56 |
| 1262998 | 6/1969 | United Kingdom | 219/56 |

*Primary Examiner*—E. A. Goldberg
*Attorney, Agent, or Firm*—Ernest F. Marmorek

[57] ABSTRACT

The invention relates to a grid welding machine operating on the electrical resistance welding principle and having continuous forward feed of the longitudinal wires. Groups of rotary electrodes and counter-electrodes cooperate in pairs and are arranged above and below the feed path of the longitudinal wires respectively. The electrodes and counter-electrodes are formed as rollers, opposite each electrode roller on the far side of the feed path of the longitudinal wires a counter-electrode being disposed in the same plane. The electrode rollers are spring-loaded individually in the direction towards the associated counterelectrode roller. Between the counter-electrode rollers and coaxially therewith there are arranged substantially circular cross-wire feed discs each having a number of grooves provided at angular intervals along the periphery of said disc for receiving said cross-wires. The feed discs are fixed for rotation on a driving shaft and the counter-electrodes are mounted on and rotatable relative to the driving shaft.

9 Claims, 4 Drawing Figures

GRID WELDING MACHINE

BACKGROUND OF THE INVENTION

The invention relates to a grid welding machine operating on the electrical resistance welding principle and having continuous forward feed of the longitudinal wires. Groups of rotary electrodes and counter-electrodes co-operate in pairs and are arranged above and below the feed path of the longitudinal wires, respectively. The feed path for the cross-wires has an end section which is curved coaxially with the axis of rotation of the groups of electrodes, and which opens out generally tangentially into the feed path of the longitudinal wires. Such a machine is hereinafter described as "of the kind hereinbefore described."

In the case of a grid welding machine of this species, known from the West German DAS No. 1 108 354, block-shaped welding electrodes and counter-electrodes are arranged in rows along the generatrices of cylindrical drums having parallel axes, and the drum carrying the active electrodes contains inside it the welding transformers connected to the electrodes, whilst the counter-electrodes are formed on the other drum as spring-mounted passive current-bridges. With each individual row of active electrodes a cross-wire holder is associated, and on the drum carrying the active electrodes cross-wire reels are mounted, to rotate with it, and also picker-gear which during the rotation of the drum pulls wire off the reels and delivers it into the cross-wire holders. The cross-wires delivered to the holders are cut to length by means of shears rotating with the holders and then carried by the holders, into alignment with the associated rows of electrodes along a curved feed path which in the welding region opens out tangentially into, and in the direction of the feed path of the longitudinal wires.

This known machine has a relatively complicated and space-wasting construction and it includes relatively large moving masses since with each row of electrodes its own cross-wire reel must be associated. In order to keep the moving masses within acceptable limits, the reels must be made relatively small, which on the other hand demands frequent exchange of empty reels for full ones and therefore frequent stopping of the machine. Again, the known machine does not enable the pitch between the cross-wires to be altered.

SUMMARY OF THE INVENTION

According to the invention, in a grid welding machine of the kind hereinbefore described, both the electrodes and counter-electrodes are formed as rollers, opposite each electrode roller on the far side of the feed path of the longitudinal wires a counter-electrode being disposed in the same plane, the electrode rollers being spring-loaded individually in the direction towards the associated counter-electrode rollers, between the counter-electrode rollers, and coaxially therewith, there being arranged substantially circular cross-wire feed-discs each having a number of grooves provided at angular intervals along the periphery of the disc, for receiving the cross-wires, the feed-discs being fixed for rotation on a common driving-shaft, and the counter-electrode rollers being mounted on and rotatable relative to the driving-shaft.

The invention is aimed at considerably simplifying the overall construction of a grid welding machine of the species specified in the introduction, and in particular to reduce the moving masses; again, the type of construction in accordance with the invention enables, by simple additional mechanisms, also alteration of the cross-wire pitch when welding grids together.

With this machine, apart from a drive for the longitudinal wire forward-feed mechanism, only one drive is necessary for the cross-wire feed-discs, whereas the electrode and counter-electrode and counter-electrode rollers are supported to be able to rotate freely, and upon welding the work to be welded is taken along with it intermittently so as to rotate in the direction of the forward feed of the longitudinal wires. Through the avoidance of positive synchronization of the motion of the cross-wires along their feed path with a motion of the electrodes and counter-electrodes, on the one hand one ensures that in welding there are always other parts of the peripheries of the electrode and counter-electrode rollers coming into contact with the work to be welded, so that essentially uniform wear of the electrodes results, and on the other hand the important advantage is achieved that upon the motion of the cross-wires along the feed path any desired scheme of motion in comparison to the forward feed of the longitudinal wires can be imposed, so that, in particular, the introduction of the cross-wires into the grooves in the feed-discs is possible during a slow phase of motion, or even a stoppage of the feed-discs. Furthermore, the feeding of the cross-wires to the welding region may be slowed down or accelerated by a correspondingly alterable drive of the feed-discs in order to change the pitch of the cross-wires.

BRIEF DESCRIPTION OF THE DRAWING

One example of a welding machine according to the invention will now be described with reference to the accompanying drawings in which.

DESCRIPTION OF THE PREFERRED EMBODIMENTS

Figure 1:
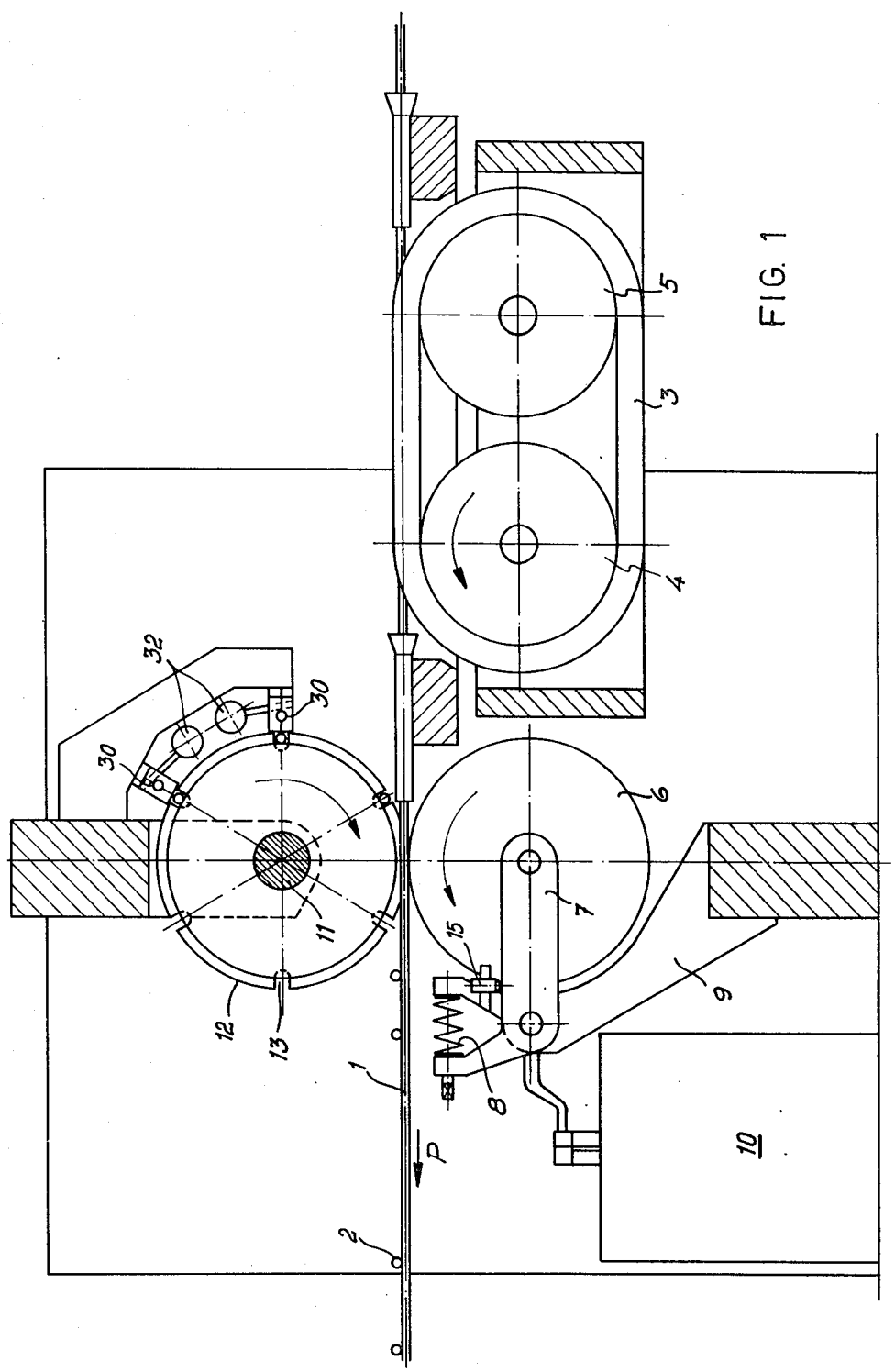
FIG. 1 is a diagrammatic side elevation of the machine, partly in longitudinal section.

In FIG. 1 a welded grid can be seen, which has longitudinal wires 1 and cross-wires 2, and is shown being conveyed in the direction of the arrow P through the welding machine. The forward feed of the grid or its longitudinal wires is effected at constant speed by means, for example, of chains 3 in which each link carries clamping parts which are, in themselves known, and therefore not shown, and which are each capable of grasping a longitudinal wire 1 and taking it by frictional contact along the upper side of the chain. As usual, the chains are looped round a driving roller 4 and an idler 5, the distance between which can preferably be altered in order to be able to impart the necessary tension to the chains. Below the plane of production of the grid, electrode rollers 6 are arranged. Each electrode roller 6 is supported at one end of a two-armed lever 7 and at the other end is loaded by a helical spring 8 in such a direction that the electrode roller 6 is forced against the associated longitudinal wire 1 of the grid. The end of a carrier 9 to which the two-armed lever 7 is hinged, acts as abutment for the spiral spring 8.

Stationary welding-transformers 10 are also arranged in the machine housing. Adjacent electrode rollers 6 are insulated from one another and connected via slip rings or the like (not shown) to the two ends of the secondary conductor of one of the transformers 10.

Figure 2:
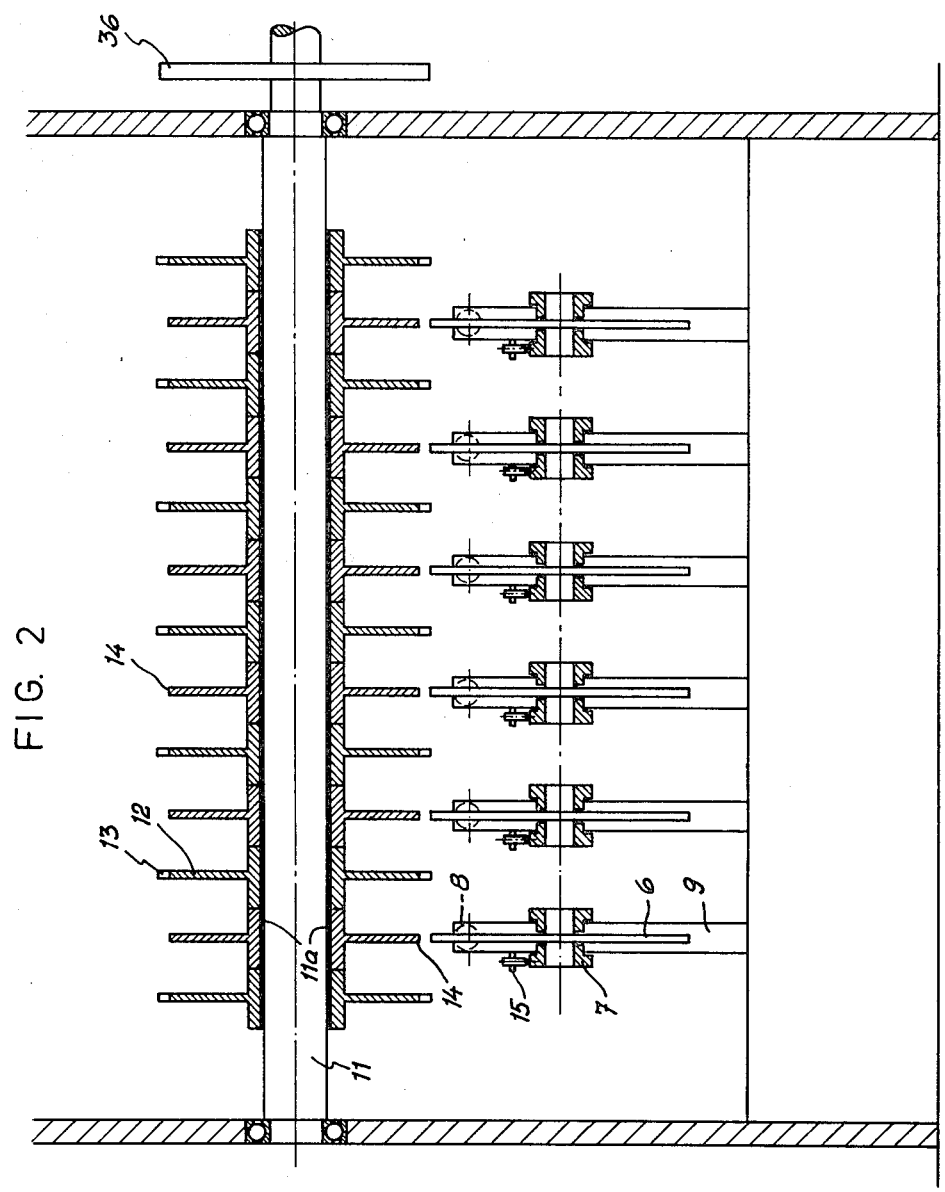
FIG. 2 is a section through the electrode and counter-electrode rollers as well as the cross-wire feeder, seen in the direction of forward feed of the longitudinal wires.

Above the plane of production of the grid a shaft 11 is arranged extending transversely across the width of the machine. To this shaft 11 are fixed for rotation generally circular feed-discs 12, along the periphery of which are provided grooves 13 at equal angular intervals. These grooves are used for receiving cross-wires, and for feeding them to the welding region between the electrode rollers 6 and associated counter-electrode rollers 14. The counter-electrode rollers 14 are, as shown in FIG. 2, each arranged between two adjacent feed-discs 12, but, as distinct from the discs 12 are freely supported rotatably on the shaft 11. For ensuring the full desired and predetermined welding pressure the cross-wire feed-discs 12, as may be seen particularly clearly from FIG. 3, must have a larger radius $r_3$ than the radius $r_2$ of the counter-electrode rollers 14, and the most radially inward positions of the grooves 13 in the cross-wire feed-discs 12 must lie on a radius $r_1$, which is smaller than the radius $r_2$ of the counter-electrode rollers 14. In order, on the other hand, to prevent a dead shortcircuit between the electrode and counter-electrode rollers 6 and 14, the minimum clearance between these rollers must be able to be set, advantageously by adjustable stops 15 which co-operate with, for example, the rocking levers 7 of the rollers 6.

The shaft 11 is clad with a jacket 11a of highly conductive material which in FIG. 2 has been indicated by thick black lines, and serves at the same time as a common current-bridge for all of the counter-electrode rollers 14. Hence, in welding, the current flows out of the lower electrode roller 6, through the wires 1 and 2, into the upper counter-electrode roller 14 associated with it, out of the latter into the conductive jacket 11a on the shaft 11, then along this jacket to the adjacent upper counter-electrode roller 14, and finally out of this, through the adjacent wires 1 and 2, into the lower electrode roller 6 associated with it, which is connected to the same welding transformer 10 as the lower electrode roller 6 first mentioned. Each time, at the transition from an electrode to the counter-electrode and vice versa, the current passes through the wires 1 and 2 crossing one another and effects their welding at their point of contact. During this welding process the freely rotatably supported rollers 6 and 14 which are co-operating at the time get carried along by the work to be welded, and turned through a small angle.

Figure 3:
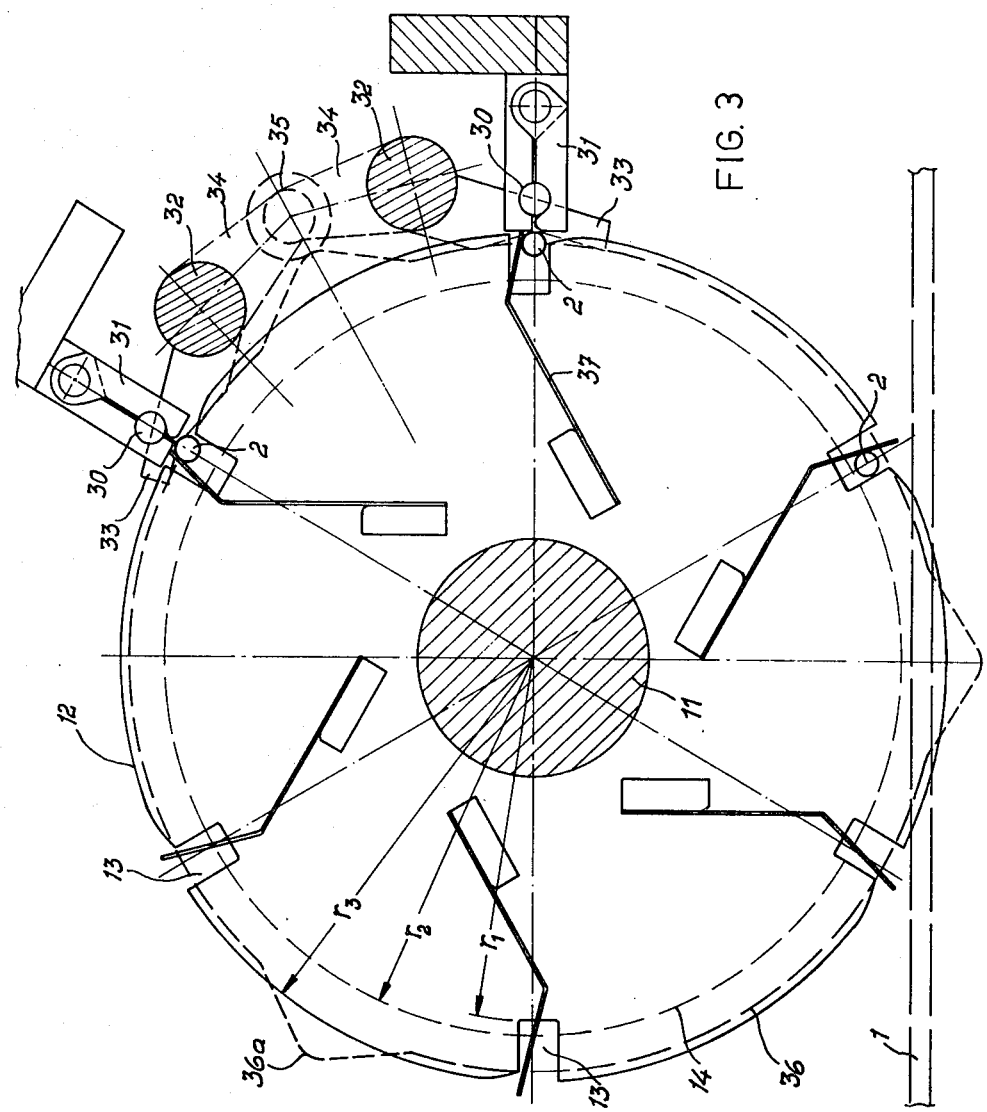
FIG. 3 is a partially sectioned view showing the introduction of cross-wires into the cross-wire feeder.

In order that the cross-wires may be introduced into the grooves 13 in the feed-discs 12 in the short time available, (in the case of the embodiment illustrated diagrammatically in FIG. 3), at a slight clearance radially outside the feed-discs 12, a number of separate feedways 30 for cross-wires are provided at angular intervals corresponding to the angular intervals of the grooves in the feed-discs 12. These feedways are in turn fed by known stationary picking gear and are associated with a mechanism, described in more detail below, for causing simultaneous radially inwards movement of the fed cross-wires into the feed-grooves 13.

Close to each feedway 30 is arranged a shaft 32 which carries at intervals a number of feed-levers 33 which are connected rigidly to the shaft. An actuating lever 34 likewise rigidly connected to the shaft 32 carries a pick-up roller 35 for a cam-disc 36 which in turn is arranged rigidly on the shaft 11, and therefore rotates with the shaft. The number of the grooves 13 arranged along the periphery of the feed-discs 12 must be a whole-number multiple of the number of pickways 30 provided. Further, the number of control-cams 36a distributed along the periphery of the cam-disc 36 must be equal to this multiple.

It is further advantageous to chamfer-off a little the boundaries of each groove 13 lying in front of the groove in the direction of rotation of the feed-discs 12, in order to guarantee safe reception of the cross-wires 2 being fed in. Finally in order to hold the cross-wires 2 firmly in the grooves until the welding with the longitudinal wires, but on the other hand to ensure unimpeded release of the cross-wires from the grooves after welding has been carried out, a sprung holder 37 for the cross-wire is associated with each groove 13 of at least two feed-discs 12.

As soon as the pick-up roller 35 runs into one of the cams 36a of the cam-disc 36 the shafts 32 are caused to rotate. The feed-levers 33 are thereby swivelled in a direction for delivery of the cross-wires 2 out of the feedways 30. That is, through the pressure of the feed levers 33 against a cross-wire, spring-loaded flaps 31 which hold the cross-wire firmly, are opened, and the cross-wire is forced out of the feedway 30. Via the bevelled-off edge portion of the feed-discs 12 the cross-wire arrives in a row of aligned grooves 13, the sprung holders 37 which partially close off this row of grooves being first of all pushed to the side.

Since all of the feedways (in the example two) are emptied simultaneously by the cam mechanism, a corresponding number of rows of grooves along the peripheries of the feed-discs 12 are subsequently armed with cross-wires. Before a fresh delivery of cross-wires can be affected from the pickways 30 onto the feed-discs 12, first of all just as many cross-wires must be welded on, as have just now been fed in. Only after this has been done, does an empty groove 13 lie once more opposite to each pickway 30. Hence the time which is necessary for the welding-on of a corresponding number of cross-wires is available for the feeding of the new cross-wires into the feedways 30. Consequently feeding can be done at correspondingly lower speed than has previously been possible.

As already mentioned, the angular velocity of the driven cross-wire feed-discs 12 is in general alterable, so that the delivery of the cross-wires from the feedways 30 to the grooves 13 is advantageously effected at minimum angular velocity. When a cross-wire reaches the welding region, the rotary motion of the feed-discs must on the other hand briefly, that is long enough for the welding process to be carried out, be synchronized with the forward feed of the longitudinal wires in such a way that the motion of the cross-wires in the welding region is matched to the forward feed motion of the longitudinal wires. This synchronization, which in the case of known grid welding machines is provided positively during the whole time in operation, in the case of a machine in accordance with the invention, is only a brief phase, in order to enable welding of the two wires crossing one another.

Between successive welding processes the cross-wire feed-discs may be driven either faster or slower, so as to correspond with the mentioned synchronous running speed.

The faster or slower the feed-discs 12 are driven, the shorter or longer are the intervals of time, respectively in which successive cross-wires reach the welding line and the smaller or greater therefore becomes the pitch or interval between adjacent cross-wires, since the mechanism for feeding the longitudinal wires forward is assumed to be driven continuously at uniform speed.

Figure 4:
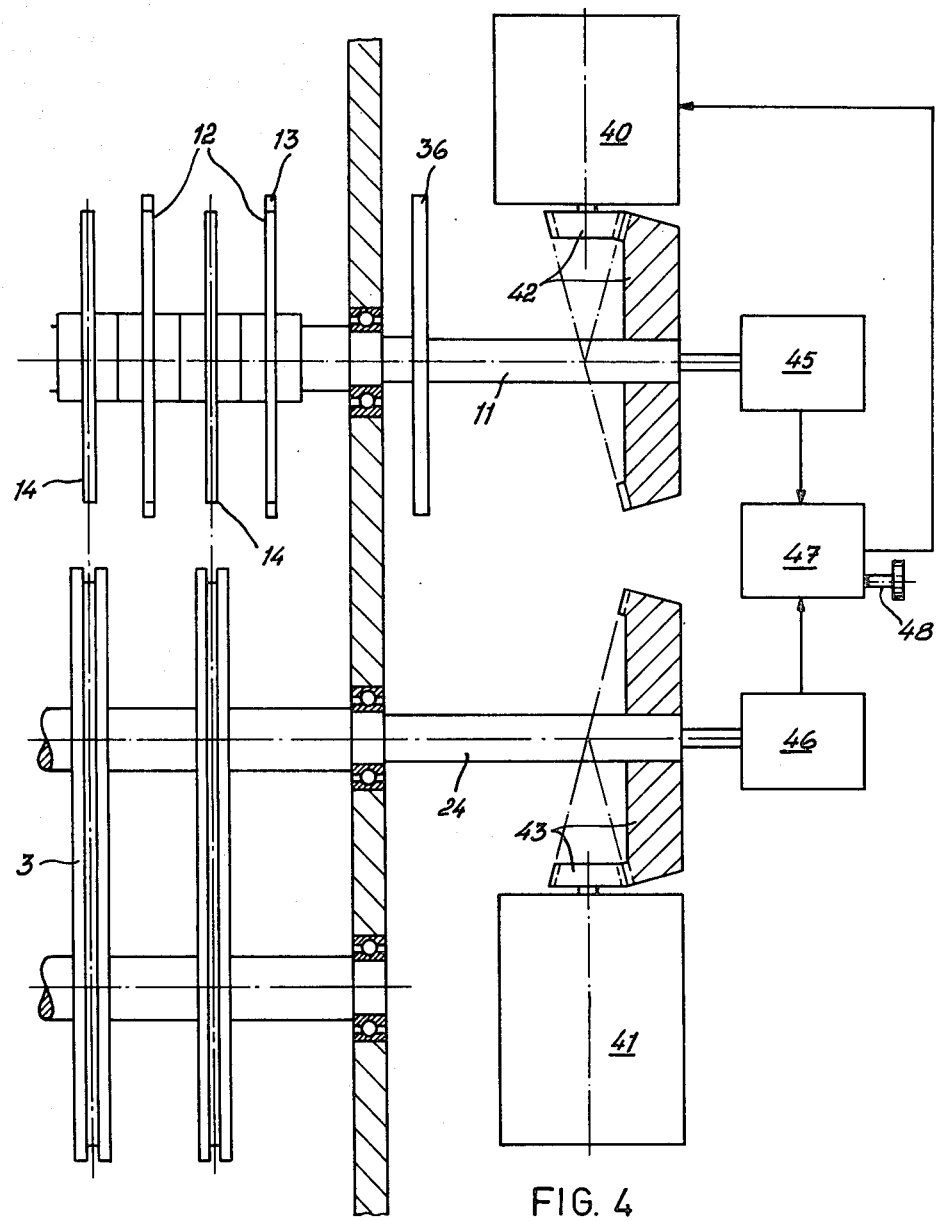
FIG. 4 shows diagrammatically an embodiment of the drive of the longitudinal-wire forward-feed mechanism and of the cross-wire feeder.

FIG. 4 explains diagrammatically how in this sense a grid welding machine in accordance with the invention may be made to have an automatically alterable cross-wire pitch. Two motors 40, 41, independent of one another, drive the shafts 11 and 24 respectively via bevel gears 42,43. The driving rollers 4 are keyed on to the shaft 24 for rotation therewith. A pulse emitter 45, 46 is associated with each of the two shafts 11 and 24. Each pulse emitted by the pulse emitters 45, 46 corresponds to a certain angular difference between two successive positions of the shafts. The pulses are fed to a control apparatus 47 which can, by counting the pulses which have arrived since a certain starting instant, say the last instant of switching on of the welding current, determine the alterations in angle by the two shafts 11 and 24, which have occurred respectively since this instant. Since furthermore any alteration in angle of the shaft 24 corresponds to a certain distance covered by the longitudinal wire, the length of forward feed covered by the longitudinal wire can in this way be determined too.

As external input value the required pitch between the cross-wires may be inserted into the control apparatus 47 by means, e.g., of a knob 48. By comparison of the frequencies of the pulses arriving from the pulse emitters 45 and 46 to the frequency of a comparison oscillator circuit operating at a constant frequency, the control apparatus can also determine the angular velocities of the shafts 11 and 24. On the basis of the inserted required cross-wire pitch the control apparatus 47 determines that velocity at which the feed discs 12 must be driven between two successive welding processes in order to bring adjacent cross-wires into required mutual spacings for layout on the longitudinal wires.

This velocity is designated as the "velocity of conveyance" to distinguish it from the "synchronous velocity," by which is to be understood that velocity of rotation of the feed-discs 12 at which the tangential velocity of a cross-wire 2 held in the grooves 13 is exactly equal to the velocity of forward feed of the longitudinal wires 1. The construction of the control apparatus 47 does not form a part of the present invention and its construction therefore does not need to be explained in detail in this connection. What are important are merely the actions of the control apparatus 47 as already explained, in order to be able to understand the way of operation of the grid welding machine of the invention.

The operation is as follows:-The motor 41 runs at constant speed and the longitudinal wires 1 are accordingly fed forward also at constant speed. Assume that a cross-wire 2 has just reached the welding region between the electrodes 6 and 14 and the welding current has been switched on. The motor 40 in that case gets driven at the "synchronous velocity," i.e., the tangential velocity of the cross-wire 2 along the periphery of the feed-discs 12 corresponds exactly with the forward feed velocity of the longitudinal wires 1. Hence the welding can be performed correctly, since the relative velocity between the longitudinal wires and the cross-wire is zero.

After the feed-discs 12 and with them the shaft 11 have passed through a certain firmly predetermined angle to which a certain number of pulses (emitted by the emitter 45) correspond, the grooves 13 are released from engagement with the cross-wire 2, which has just been welded on.

At this instant the control apparatus 47 switches over the motor 40 to the "velocity of conveyance" and maintains this velocity within the necessary angle of rotation of the feed-discs 12 up to the entry of the next cross-wire into the welding region. The time interval spent in doing this, which is dependent upon the velocity of conveyance, is decisive for the pitch of the cross-wires in the grid being produced and is established by the appropriate setting of the knob 48 on the control apparatus 47. As soon as the next cross-wire is lying in direct proximity to the welding region, changeover is effected by the control apparatus 47 from the velocity of conveyance to the synchronous velocity, so that the next cross-wire can be welded onto the longitudinal rods.

Via the control apparatus 47 the motor 40 can, in addition, also be influenced by other parameters, so that within each revolution a motion can be imposed upon the feed-discs 12, which varies in accordance with any scheme desired.

Quite generally, within the scope of the invention the driving shaft 11 of the cross-wire feed-discs 12 may be coupled mechanically or electrically to the driving shaft 24 of the chains 3 which effect the forward feed of the longitudinal wires during synchronous motion of the longitudinal wires, and the cross-wires at the time when the cross-wires pass through the welding region lying between the electrode and counter-electrode rollers. However, the instantaneous and/or average angular velocity of the feed-discs may during the remaining intervals of time be alterable according to any desired scheme.

We claim:

1. A machine for welding grids of longitudinal and cross-wires, comprising in combination:

means for feeding said longitudinal wires continuously through said machine;

means defining a feed-path for the longitudinal wires, and a feed-course for the cross-wires substantially transverse thereto;

a plurality of rotary electrodes disposed on one side of said feed-path for the longitudinal wires, an equal plurality of counter electrodes arranged on the other side of said feed-path, both said electrodes and said counter electrodes comprising rollers, each of said counter electrode rollers being disposed substantially coplanar with a respective electrode roller, and on the opposite side of the feed-path thereof, said electrode rollers being spring loaded towards said counter-electrode rollers;

a plurality of cross-wire feed-discs, each of said cross-wire feed discs being substantially circular, and being mounted substantially coaxially with said counter electrode rollers, and having a plurality of grooves passing therethrough, said grooves being provided at angular intervals along the periphery of each of said feed discs for receiving said cross-wires;

a plurality of cross-wire feed-ways, said cross-wire feed-ways being disposed radially outside said cross-wire feed-discs at angular intervals corresponding to the angular intervals of said grooves in said cross-wire feed-discs;

means associated with said cross-wire feed-ways for simultaneously feeding said cross-wires radially inwardly into said grooves and a driving shaft having said cross-wire feed-discs secured thereto for rotation therewith, said counter electrode rollers being mounted on, and rotatable relative to said driving shaft.

2. A welding machine according to claim 1, wherein said cross-wire feed discs have a larger radius than the radius of said counter-electrode rollers, and wherein the most radially inward portions of said grooves in said feed-discs lie on a circle of radius smaller than said radius of said counter-electrode rollers.

3. A welding machine according to claim 1, further including an adjustable stop for adjusting a clearance between each of said electrode rollers and said associated counter-electrode rollers to a minimum value.

4. A welding machine according to claim 1, wherein said driving shaft is a first driving shaft, and further comprising a longitudinal-wire forward-feed mechanism including a second driving-shaft, and linking means for coupling said first and said second driving shafts together for synchronous motion of said longitudinal wires and said cross-wires, when said cross-wires pass between said electrode and said counter-electrode rollers.

5. A welding machine according to claim 4, wherein said linking means is a mechanical linkage.

6. A welding machine according to claim 4, wherein said linking means is an electrical linkage.

7. A grid welding machine according to claim 4, wherein said synchronous motion corresponds to a predetermined angular velocity of said feed-discs for a predetermined fraction of a period of rotation thereof, and further including means for adjusting the angular velocity of said feed-discs during the remaining period of rotation of said discs.

8. A grid welding machine according to claim 7, wherein said angular velocity is an instantaneous velocity.

9. A grid welding machine according to claim 7, wherein said angular velocity is an average velocity.

* * * * *